Oct. 26, 1926.
J. F. PORTERFIELD
TIRE REMOVING TOOL
Filed August 20, 1925
1,604,306
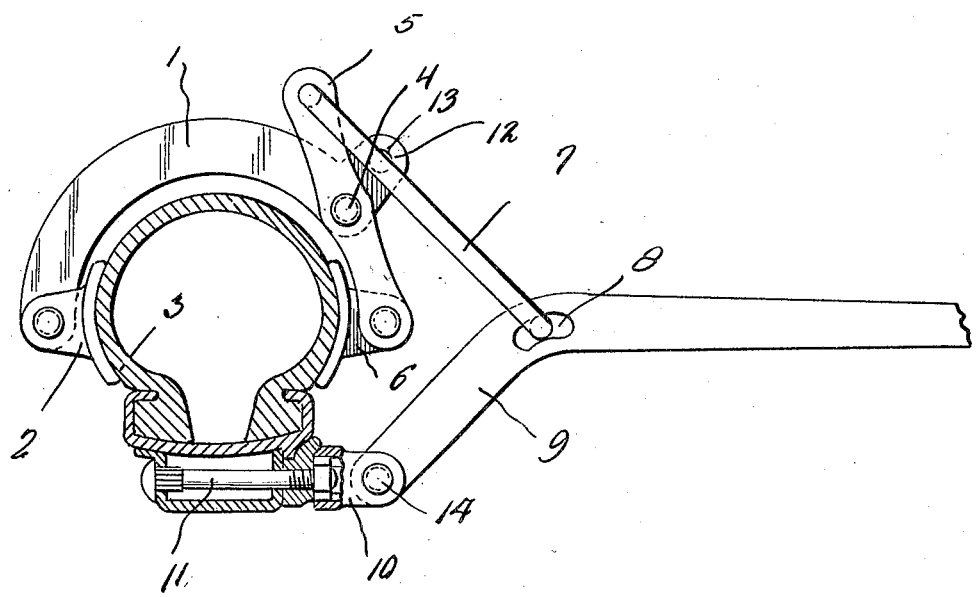
Inventor
J. F. Porterfield,
By Clarence A. O'Brien
Attorney Patented Oct. 26, 1926.

1,604,306

UNITED STATES PATENT OFFICE.

JOHN F. PORTERFIELD, OF HAMBURG, IOWA.

TIRE-REMOVING TOOL.

Application filed August 20, 1925. Serial No. 51,458.

This invention relates to an improved tool for removing a tire or tire casing from a rim, either of the clincher or demountable type.

My principal object is to generally improve upon tools of this class by providing one of comparative simplicity and durability which embodies novel details associated in a novel manner for producing an exceedingly practical, useful and efficient structure.

Other objects and advantages of the invention will become apparent from the following drawings and description.

In the accompanying drawings forming a part of this application and in which like numerals are employed to designate like parts throughout the same:

The single figure represents an elevation of a tool constructed in accordance with this invention showing the manner in which the same is used.

Referring to the drawing, the reference character 1 designates an arcuate member to one end of which a shoe 2 is pivotally connected. This shoe is provided with a portion shaped to effectively engage the adjacent side wall of the casing 3. The opposite end of this arcuate member 1 is directed angularly as indicated at 12. A stud 13 projects laterally from the angularly disposed portion 12 and the purpose thereof will be hereinafter more fully described. Pivoted between its ends as at 4 is an arm 5. Mounted on the inner end of this arm is a complemental shoe 6 which is adapted to be disposed opposite the first named shoe 2. A link 7 is connected to the opposite end of the arm and the opposite end of this link is connected to a slot 8 formed in the intermediate part of an operating lever 9. On the inner end of this operating lever is a socket 10 adapted for reception of the nut on the end of the bolt 11. In this connection I would state that the bolt and nut, cooperating lug, rim and the tire are conventional and constitute no part of the invention.

With the parts arranged as shown in the figure of the drawing, it is obvious that when the lever 9 is swung downwardly on its pivot 14, the upper or inner end of the arm 5 which carries the shoe 6 will be moved inwardly, and the outer end of the arm will move outwardly so that the coacting or complementary shoes will compress the tire casing and thereby disengage the beads of the casing from the rim of the wheel. The laterally projecting stud 13 which is carried by the angularly projecting portion 12 will engage the outer side edge of the arm 5 for limiting the outward swinging movement of the outer end portion of the arm so that the tire casing will not be injured or otherwise cut by the action of the inwardly moving shoe 6.

While the preferred embodiment of the invention has been shown and described, it is to be understood that minor changes coming within the field of invention claimed may be resorted to if desired.

Having thus described my invention, what I claim as new is:—

1. In a tire tool of the class described, a pair of complementary casing engaging shoes, an arcuate member on the end of which one shoe is mounted, an arm pivoted between its ends to the opposite end of said member, the other shoe being pivotally mounted on one end of said arm, an operating lever, and a link connected between the other end of said arm and the intermediate portion of said lever.

2. In a tire tool of the class described, a pair of complementary casing engaging shoes, an arcuate member on the end of which one shoe is mounted, an arm pivoted between its ends to the opposite end of said member, the other shoe being pivotally mounted on one end of said arm, an operating lever, a link connected between the other end of said arm and the intermediate portion of said lever, and a socket carried by the inner end of said lever and adapted to be engaged over the nutted end of a rim securing bolt.

3. A tire tool of the class described comprising an arcuate shaped member, a tire casing engaging shoe pivotally secured on one end of said member, the other end of the arcuate member being disposed angularly, an arm pivotally supported intermediate its ends on said arcuate member adjacent the angularly disposed end portion thereof, a complementary tire casing engaging shoe pivotally carried by the inner end of said arm, an operating lever, a link connecting the other end of said arm to the intermediate portion of said operating lever, and a stud projecting laterally from the angularly disposed portion of the arcuate member providing a stop for limiting the outward swinging movement of the outer end of said arm.

4. A tire tool of the class described comprising an arcuate shaped member, a tire casing engaging shoe pivotally secured on one end of said member, the other end of the arcuate member being disposed angularly, an arm pivotally supported intermediate its ends on said arcuate member adjacent the angularly disposed end portion thereof, a complementary tire casing engaging shoe pivotally carried by the inner end of said arm, an operating lever, a link connecting the other end of said arm to the intermediate portion of said operating lever, a stud projecting laterally from the angularly disposed portion of the arcuate member providing a stop for limiting the outward swinging movement of the outer end of said arm, and a socket member pivotally associated with the inner end of the operating lever and adapted for engagement with the lock nut threaded on the usual rim securing bolt, said socket member providing a fulcrum for the operating lever.

In testimony whereof I affix my signature.

JOHN F. PORTERFIELD.